(12) United States Patent
Lu et al.

(10) Patent No.: US 9,434,886 B2
(45) Date of Patent: Sep. 6, 2016

(54) PROCESS FOR EXTRACTING LYCOPENE

(75) Inventors: Qingguo Lu, Hebei Province (CN);
Yunhe Lian, Hebei Province (CN);
Wenjie Han, Hebei Province (CN);
Yuhai Tong, Hebei Province (CN);
Xuehui Su, Hebei Province (CN);
Xiaodong An, Hebei Province (CN);
Junqiang Zhang, Hebei Province (CN)

(73) Assignee: Chenguang Biotech Group Co. Ltd., Hebei Province (CN)

( * ) Notice: Subject to any disclaimer, the term of this patent is extended or adjusted under 35 U.S.C. 154(b) by 95 days.

(21) Appl. No.: 13/825,778

(22) PCT Filed: Dec. 31, 2011

(86) PCT No.: PCT/CN2011/002234
§ 371 (c)(1),
(2), (4) Date: Aug. 26, 2013

(87) PCT Pub. No.: WO2013/097055
PCT Pub. Date: Jul. 4, 2013

(65) Prior Publication Data
US 2014/0316175 A1 Oct. 23, 2014

(51) Int. Cl.
*A23L 1/24* (2006.01)
*C10G 1/00* (2006.01)
*C09B 61/00* (2006.01)
*A23L 1/30* (2006.01)
*A23L 1/275* (2006.01)

(52) U.S. Cl.
CPC ............ *C10G 1/002* (2013.01); *A23L 1/2753* (2013.01); *A23L 1/3002* (2013.01); *C09B 61/00* (2013.01)

(58) Field of Classification Search
None
See application file for complete search history.

(56) References Cited

U.S. PATENT DOCUMENTS

| | | | | |
|---|---|---|---|---|
| 2,952,962 A * | 9/1960 | Suverkrop | ............ | A01D 45/00 56/130 |
| 5,837,311 A | 11/1998 | Zelkha et al. | | |
| 6,042,863 A * | 3/2000 | George | ................ | A23L 1/0011 426/481 |
| 6,299,867 B1 * | 10/2001 | Aoyagi | .................... | A21D 2/02 424/76.1 |
| 6,440,449 B1 * | 8/2002 | Hirschberg | ............ | A23B 4/033 424/439 |
| 7,883,731 B2 * | 2/2011 | Hartal | .................. | A23L 1/2128 426/250 |
| 2006/0062861 A1 * | 3/2006 | Wille | ...................... | A61K 8/97 424/729 |
| 2008/0181995 A1 * | 7/2008 | Rawls | ................... | A23B 7/022 426/295 |

FOREIGN PATENT DOCUMENTS

| | | |
|---|---|---|
| CN | 1334328 A | 2/2002 |
| CN | 1799674 A | 7/2006 |
| CN | 101121631 A | 2/2008 |
| CN | 101298618 A | 11/2008 |
| CN | 101449801 A | 6/2009 |
| EP | 1103579 A1 | 5/2001 |
| JP | 07147929 a1 * | 11/1993 |
| JP | 2003135038 A * | 5/2003 |
| WO | WO 97/48287 * | 12/1997 |

OTHER PUBLICATIONS

Effects of Different Drying Techniques on Some Nutritional Components of Tomato by Sahin et al. Journal of Agricultural Machinery Science, pp. 71-78, 2010.*
Notification of First Office Action, Chinese Patent Application No. 201180032442.9, issued Feb. 12, 2014.
Lui et al., Research summary of extraction process of lycopene, Guangxi J. Light Industry, 3:8-9 (Mar. 2011).
Hui et al., Studies on the extraction technology and stability of lycopene, Xinjiang Agricultural Sci., 4:204-7 (Dec. 2004).

* cited by examiner

*Primary Examiner* — Tamra L Dicus
(74) *Attorney, Agent, or Firm* — Marshall, Gerstein & Borun LLP

(57) ABSTRACT

A process for extracting lycopene, comprising the following steps: pressing and dehydrating tomato pomace which is the by-products of tomato processing production, then drying it to control the water content in the range from 10% to 20%; crushing the dried tomato pomace, and separating tomato skins and tomato seeds by air blast process, granulating the separated tomato skins and extracting them, then purifying by removing impurity from the extracted lycopene with active carbon. The process uses the by-products of tomato production as raw material, thus increasing the utilization ratio of tomatoes; the way of separating the seeds and skins after dehydrating and drying can save water and reduce the discharge of pollutant; the addition of antioxidant in the process of drying avoids the impact of high temperature on lycopene; extracting after granulating the tomato skins significantly increases the extracting efficiency; treating the extracting solution with active carbon effectively can remove the pesticide residues, impurities, odor etc., and thus increase the quality of lycopene.

9 Claims, No Drawings

PROCESS FOR EXTRACTING LYCOPENE

TECHNICAL FIELD

This invention relates to the field of food technology, particularly to a process for extracting lycopene from tomato skins.

BACKGROUND ART

Lycopene, which is an important kind of carotenoid substance, has a unique long chain molecular structure and possesses more unsaturated double bonds than other carotenoids. Due to its special structure, lycopene has antioxidant capacity and ability to eliminate free radicals. The antioxidation effect of lycopene is two times of β-carotene and 100 times of vitamin E. The healthcare functions of lycopene cover many aspects, such as anti-aging, preventing cancer, enhancing immunity, cosmetic effect, and anti-ultraviolet radiation etc. It is becoming a new research hotspot in health food, cosmetics and medical fields.

China is one of the main countries planting tomatoes, tomato in China accounts for about 20% of the global yield, which is mainly planted in Xinjiang, Gansu and Inner Mongolia. Most of tomatoes in China are used for manufacturing processed tomato including tomato paste, tomato juice and concentrated tomato pulp. The by-product in the manufacturing process, tomato pomace, is generally treated as wastes and thrown away, while there exist a lot of available carotenoids in the tomato pomace, especially lycopene. Therefore, it is a topic worth thorough discussion about how to make use of tomato pomace.

European Patent EP 1103579 discloses a method of extracting lycopene, including washing tomatoes, tomato pomace etc. with low content of hot ethanol to remove the impurities and water, and then using high content of hot ethanol to extract lycopene. Although this extraction process is relatively simple, it leads to low yield of lycopene due to very low solubility of lycopene in ethanol.

U.S. Pat. No. 5,837,311 discloses a process of obtaining oleoresin containing lycopene, including crushing tomato as raw material, pulping extracting with solvent and other processes. This process uses tomatoes as raw material without the treatment of dehydration, resulting in a low yield; a large amount of solvent is needed in this process, resulting in high cost and making large scale production unsuitable.

Chinese Patent Application Publication No. CN101449801A discloses tomato skins are taken as raw material, followed by crushing the material with colloid grinder, then dehydrating with ethanol and extracting with organic solvent to produce lycopene. In this process, since the wet tomato skins containing high amount of water need to be washed and the crush capability of the colloid grinder is limited, large scale production is subjected to restriction.

Chinese Patent Application Publication Nos. CN1799674, CN1334328A and CN101298618A respectively disclose processes for extracting extracting lycopene, including using tomato skins as raw material and applying supercritical carbon dioxide extraction. The use of supercritical extraction device increases the cost and affects the industrial scale of producing lycopene from the raw material of tomato skins.

Chinese Patent Application Publication No. CN101121631A discloses that tomatoes and tomato pomace are taken as raw materials, and extracted by using ultrasound/microwave synergistic technology associated with solvent to obtain lycopene. Although the yield of lycopene may be relatively high using this process, it cannot be used in large scale industrial production due to use of ultra-sound/microwave technology, resulting in less practicability.

CONTENTS OF THE INVENTION

The object of the invention is to provide a process for the production of lycopene.

The technical solutions of the invention are provided as follows.

The present application provides a process for extracting lycopene, comprising the following steps:
 a) dehydrating the raw material containing lycopene;
 b) drying the dehydrated raw material containing lycopene in the presence of antioxidant;
 c) coarsely crushing the dried raw material containing lycopene;
 d) separating the coarsely crushed raw material containing lycopene by air blast process, and taking the portion of raw material with a less relative density;
 e) finely crushing the portion of raw material with a less relative density obtained after separation step and granulating it;
 f) subjecting the resulting granules to extraction with organic solvent;
 g) treating the resultant of extraction with active carbon and filtering, then concentrating the filtrate to obtain lycopene product.

The said raw material containing lycopene is tomato pomace comprising tomato seeds.

The said dehydration is carried out by compression, and the water content of the dehydrated raw material is controlled at about 70% of the total weight.

The said antioxidant is a water soluble antioxidant, which is one of proanthocyanidin, grape polyphenol, tea polyphenol, ascorbic acid and sodium salt thereof, isoascorbic acid and sodium salt thereof.

The drying process is to dry the dehydrated raw material containing lycopene through the belt dryer, the drying temperature is 200-300° C., and the water content of the dried raw material is 10-20% by weight.

The coarse crushing is to crush the dried raw material into pieces with a size of 4-6 mm.

The portion of raw material with a less relative density comprises tomato skins and tomato seeds, wherein the weight of the tomato seeds is less than 0.5% of the total weight, and the weight of the tomato skins is greater than 99% of the total weight.

The fine crushing is to crush the raw material to 40-60 mesh, and the granulation is to granulate the finely crushed raw material through granulator. The resulting granules have a diameter of 0.3-0.5 cm and length of 0.5-1 cm.

The organic solvent is one of alkane, esters and ethers, the addition amount of the organic solvent is 1-10 times weight of the granules obtained from the granulation step.

The active carbon used is powdered active carbon.

The treatment with active carbon is carried out by adding powdered active carbon to the resultant of extraction and stirring it, wherein the weight ratio of the active carbon to the resultant of extraction is 1:50-500, the stirring temperature is 40-80° C., and the stirring time is 30-150 minutes.

The advantageous effects of the invention lie in that:
 1. The way of separating the seeds and skins after dehydrating and drying avoids producing a large amount of waste water caused by separating the seeds and skins with water, and reduces environment pollution;

2. Since tomato pomace contains a large amount of water, drying it directly needs a great quantity of energy; and the way of drying after dehydrating the tomato pomace may reduce the use of energy and the discharge of pollutant;

3. The addition of antioxidant in the process of drying reduces the impact of high temperature on lycopene, increases yield of extracted lycopene, and avoids the loss of lycopene;

4. Using tomato skins after removing tomato seeds to produce lycopene avoids introducing the pectin of tomato seeds into the lycopene oleoresin and increases the quality and content per unit of lycopene oleoresin;

5. Extracting lycopene after granulating the raw material can increase the yield of lycopene significantly;

6. Treating the extraction solution with active carbon may effectively remove the impurities, odor, pectin and pesticide residue etc., thus increasing the quality of lycopene oleoresin;

7. This process has large feeding amount of raw material and a high yield of lypopene, which is easy and rapid, and suitable for continuous production in large scale.

SPECIFIC MODE FOR CARRYING OUT THE INVENTION

The following Examples are intended to further illustrate the present invention without limiting its scope.

Example 1

500 kg of tomato pomace containing 90% of water was weighted, the tomato pomace was hydrated by presser to give 167 kg of tomato pomace containing 70% of water; 0.5 kg of proanthocyanidin with a purity of 10% was added to the above resulting tomato pomace, after well mixed by mechanically stirring, the mixture was delivered to belt dryer for drying, the dried tomato pomace was crushed to give debris having a size of 4-6 mm, and the tomato seeds were revealed from the tomato skins; the tomato seeds and tomato skins are then separated by air blast process, the small amount of tomato seeds residue in the obtained debris of tomato skins (45 kg in total) accounted for 0.4% of the total weight, then the resulting tomato skins were crushed to 60 mesh, and granulated by granulator; the resulting tomato skin granules were subjected to extraction with 450 kg of ethyl acetate, the extracting solution was treated by adding 1 kg of powdered active carbon at a temperature of 40° C. and then was stirred for 30 minutes, after removing the impurity and concentrating, 0.645 kg of lycopene oleoresin with a content of 6.7% was obtained.

Example 2

700 kg of tomato pomace containing 90% of water was weighted, the tomato pomace was hydrated by presser to give 233 kg of tomato pomace containing 70% of water; 0.7 kg of grape polyphenol with a purity of 10% was added to the above resulting tomato pomace, after well mixed by mechanical stirring, the mixture was delivered to belt dryer for drying, the dried tomato pomace was crushed to give debris having a size of 4-6 mm, and the tomato seeds were revealed from the tomato skins; the tomato seeds and tomato skins are then separated by air blast process, the small amount of tomato seeds residue in the obtained debris of tomato skins (60 kg in total) accounted for 0.3% of the total weight, then the resulting tomato skins were crushed to 60 mesh, and granulated by granulator; the resulting tomato skin granules were subjected to extraction with 120 kg of hexane, the extracting solution was treated by adding 1 kg of powdered active carbon at a temperature of 80° C. and then was stirred for 100 minutes, after removing the impurity and concentrating, 0.798 kg of lycopene oleoresin with a content of 7.1% was obtained.

Example 3

200 kg of tomato pomace containing 70% of water was weighted, 0.5 kg of proanthocyanidin with a purity of 10% was added to the above tomato pomace, after well mixed by mechanical stirring, the mixture was delivered to belt dryer for drying, the dried tomato pomace was crushed to give debris having a size of 4-6 mm, and the tomato seeds were revealed from the tomato skins; the tomato seeds and tomato skins were separated by air blast process, the small amount of tomato seeds residue in the obtained debris of tomato skins (55 kg in total) accounted for 0.4% of the total weight, then the resulting tomato skins were crushed to 60 mesh, and granulated by granulator; the resulting tomato skin granules were subjected to extraction with 100 kg of ethyl acetate, the extracting solution was treated by adding 2 kg of powdered active carbon at a temperature of 60° C. and stirring for 120 minutes, after removing the impurity and concentrating, the 0.702 kg of lycopene oleoresin with a content of 6.9% was obtained.

INDUSTRIAL APPLICABILITY

The invention uses the by-products of tomato production as raw material, thus increasing the utilization ratio of tomatoes; the way of separating the seeds and skins after dehydrating and drying can save water and reduce the discharge of pollutant; the addition of antioxidant in the process of drying avoids the impact of high temperature on lycopene; extracting lycopene after granulating the tomato skins significantly increases the extracting efficiency; treating the extraction solution with active carbon can effectively remove impurities, off-odor, pectin and pesticide residue and the like and increase the quality of lycopene.

What is claimed is:

1. A process for extracting lycopene, comprising the following steps:
    a) dehydrating the raw material containing lycopene;
    b) drying the dehydrated raw material containing lycopene in the presence of an antioxidant other than lycopene;
    c) coarsely crushing the dried raw material containing lycopene;
    d) separating the coarsely crushed raw material containing lycopene by air blast process to a portion of raw material having a greater relative density and a lesser relative density, and taking the portion of raw material with a lesser relative density;
    e) finely crushing the portion of raw material with a lesser relative density obtained after separation step and granulating it, wherein the portion of raw material with a lesser relative density comprises tomato skins and tomato seeds, the weight of the tomato seeds is less than 0.5% of the total weight, and the weight of the tomato skins is greater than 99% of the total weight;
    f) subjecting the resulting granules to extraction with organic solvent;
    g) treating the resultant of extraction with active carbon and filtering, then concentrating the filtrate to obtain lycopene product.

2. The process for the extraction of lycopene according to claim 1, wherein the raw material containing lycopene is tomato pomace comprising tomato seeds.

3. The Process for extracting lycopene according to claim 1, wherein the dehydration of the raw material containing lycopene is carried out by compressing, and the water content of the dehydrated raw material is controlled at about 70% of the total weight.

4. The process for extracting lycopene according to claim 1, wherein the antioxidant is a water soluble antioxidant which is one of proanthocyanidin, grape polyphenol, tea polyphenol.

5. The process for extracting lycopene according to claim 1, wherein the drying is to dry the dehydrated raw material containing lycopene through the belt dryer, the drying temperature is 200-300° C., and the water content of the dried raw material is 10-20% by weight.

6. The process for extracting lycopene according to claim 1, wherein the coarse crush is to crush the dried raw material to debris with a size of 4-6 mm.

7. The process for extracting lycopene according to claim 1, wherein the fine crushing is to crush the raw material to 40-60 mesh, and the granulation is to granulate the finely crushed raw material through granulator, and resulting granules have a diameter of 0.3-0.5 cm and length of 0.5-1 cm.

8. The process for extracting lycopene according to claim 1, wherein the organic solvent is one of alkane, esters and ethers, the addition amount of the organic solvent is 1-10 times the weight of the granules obtained from the granulation step.

9. The process for extracting lycopene according to claim 1, wherein the active carbon used is powdered active carbon, wherein the treatment with active carbon is carried out by adding the powdered active carbon to the resultant of extraction and stirring it, the weight ratio of the active carbon to the resultant of extraction is 1:50-500, the stirring temperature is 40-80° C., and the stirring time is 30-150 minutes.

* * * * *